(12) United States Patent
Iwai et al.

(10) Patent No.: US 9,302,736 B2
(45) Date of Patent: Apr. 5, 2016

(54) BICYCLE SPROCKET

(71) Applicant: SHIMANO INC., Sakai (JP)

(72) Inventors: Tooru Iwai, Sakai (JP); Tetsu Nonoshita, Sakai (JP); Toyoshi Yoshida, Sakai (JP)

(73) Assignee: SHIMANO INC., Sakai (JP)

( * ) Notice: Subject to any disclaimer, the term of this patent is extended or adjusted under 35 U.S.C. 154(b) by 198 days.

(21) Appl. No.: 14/173,728

(22) Filed: Feb. 5, 2014

(65) Prior Publication Data

US 2015/0217834 A1 Aug. 6, 2015

(51) Int. Cl.
*B62M 9/10* (2006.01)

(52) U.S. Cl.
CPC *B62M 9/10* (2013.01); *B62M 9/105* (2013.01)

(58) Field of Classification Search
CPC .................................. B62M 9/10; B62M 9/105
USPC .......................................................... 474/152
See application file for complete search history.

(56) References Cited

U.S. PATENT DOCUMENTS

| 3,168,836 | A | * | 2/1965 | Militana | F16H 55/12 301/17 |
|---|---|---|---|---|---|
| 4,869,709 | A | * | 9/1989 | Nagano | B62M 9/08 474/152 |
| 5,098,346 | A | | 3/1992 | Redmond | |
| 7,435,197 | B2 | * | 10/2008 | Kamada | B62M 9/10 474/152 |
| 8,479,610 | B2 | * | 7/2013 | Valle | B62M 3/00 74/594.2 |
| 2004/0110590 | A1 | * | 6/2004 | Renshaw | B62M 9/10 474/152 |
| 2005/0233850 | A1 | * | 10/2005 | Andel | F16H 55/06 474/152 |
| 2006/0205549 | A1 | * | 9/2006 | Nonoshita | B62M 9/105 474/160 |
| 2007/0129193 | A1 | * | 6/2007 | Nonoshita | B62M 9/10 474/160 |
| 2007/0265122 | A1 | * | 11/2007 | Emura | B62M 9/105 474/152 |
| 2007/0270260 | A1 | * | 11/2007 | Latham | F16H 55/30 474/152 |
| 2008/0202284 | A1 | * | 8/2008 | Valle | B62M 3/00 74/594.1 |
| 2011/0312457 | A1 | * | 12/2011 | Wang | F16H 55/30 474/152 |
| 2013/0143704 | A1 | * | 6/2013 | Blank | B62M 9/10 474/161 |
| 2013/0184110 | A1 | * | 7/2013 | Reiter | F16H 55/303 474/152 |
| 2013/0291678 | A1 | * | 11/2013 | Valle | B62M 3/00 74/594.2 |
| 2015/0018150 | A1 | * | 1/2015 | Cowen | F16H 55/17 474/152 |
| 2015/0211623 | A1 | * | 7/2015 | Inui | F16H 55/30 474/152 |

FOREIGN PATENT DOCUMENTS

DE 20218755 U1 2/2003
EP 1619417 1/2006

* cited by examiner

*Primary Examiner* — William E Dondero
*Assistant Examiner* — Mark K Buse
(74) *Attorney, Agent, or Firm* — Mori & Ward, LLP

(57) ABSTRACT

A bicycle sprocket comprises a sprocket member and an attachment member. The sprocket member comprises a first annular portion, sprocket teeth and a first engaging portion. The first engaging portion is provided on an inner peripheral part of the first annular portion. The attachment member is configured to be bonded to the sprocket member and comprises a second annular portion and a second engaging portion. The second annular portion is provided radially inwardly of the first annular portion. The second engaging portion is configured to engage with the first engaging portion. One of the first engaging portion and the second engaging portion includes a protrusion. The other of the first engaging portion and the second engaging portion includes a groove extending in the circumferential direction. The protrusion is configured to be fitted in the groove.

29 Claims, 17 Drawing Sheets

BICYCLE SPROCKET

BACKGROUND OF THE INVENTION

1. Field of the Invention

The present invention relates to a bicycle sprocket.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been recently redesigned is a bicycle sprocket.

Most bicycles have a drive train that uses the bicycle sprocket to transmit the pedaling action from the rider to a bicycle wheel through a bicycle chain. A front sprocket and a rear sprocket have been known as the bicycle sprocket. The bicycle sprocket generally includes a plurality of teeth to engage with the bicycle chain.

SUMMARY OF THE INVENTION

In accordance with a first aspect of the present invention, a bicycle sprocket comprises a sprocket member and an attachment member. The sprocket member comprises a first annular portion, sprocket teeth and a first engaging portion. The first annular portion has a rotational center axis. The sprocket teeth protrude radially outwardly from the first annular portion and are arranged in a circumferential direction of the first annular portion. The first engaging portion is provided on an inner peripheral part of the first annular portion. The attachment member is configured to be bonded to the sprocket member and comprises a second annular portion and a second engaging portion. The second annular portion is provided radially inwardly of the first annular portion. The second engaging portion is provided on an outer peripheral part of the second annular portion and is configured to engage with the first engaging portion. One of the first engaging portion and the second engaging portion includes a protrusion. The other of the first engaging portion and the second engaging portion includes a groove extending in the circumferential direction. The protrusion is configured to be fitted in the groove.

In accordance with a second aspect of the present invention, the bicycle sprocket according to the first aspect is configured so that the second engaging portion is configured to be bonded to the first engaging portion with adhesive.

In accordance with a third aspect of the present invention, the bicycle sprocket according to the first aspect is configured so that the protrusion is configured to be bonded to the groove with adhesive.

In accordance with a fourth aspect of the present invention, the bicycle sprocket according to the first aspect is configured so that the sprocket member comprises a first material. The attachment member comprises a second material different from the first material.

In accordance with a fifth aspect of the present invention, the bicycle sprocket according to the fourth aspect is configured so that the first material comprises a first metallic material. The second material comprises a second metallic material different from the first metallic material.

In accordance with a sixth aspect of the present invention, the bicycle sprocket according to the fourth aspect is configured so that the first material has a first density. The second material has a second density lower than the first density.

In accordance with a seventh aspect of the present invention, the bicycle sprocket according to the fourth aspect is configured so that the first material comprises iron.

In accordance with an eighth aspect of the present invention, the bicycle sprocket according to the fourth aspect is configured so that the first material comprises titanium.

In accordance with a ninth aspect of the present invention, the bicycle sprocket according to the fourth aspect is configured so that the second material comprises aluminum.

In accordance with a tenth aspect of the present invention, the bicycle sprocket according to the fourth aspect is configured so that the second material comprises a non-metallic material.

In accordance with an eleventh aspect of the present invention, the bicycle sprocket according to the fourth aspect is configured so that the second material comprises a fiber reinforced plastic.

In accordance with a twelfth aspect of the present invention, the bicycle sprocket according to the first aspect is configured so that the sprocket member has a multi-layered structure with different materials.

In accordance with a thirteenth aspect of the present invention, the bicycle sprocket according to the first aspect is configured so that the first engaging portion includes a first engaging surface. The second engaging portion includes a second engaging surface bonded to the first engaging surface with adhesive. At least one of the first engaging surface and the second engaging surface is rougher than at least part of a surface other than the first engaging surface and the second engaging surface in the bicycle sprocket.

In accordance with a fourteenth aspect of the present invention, the bicycle sprocket according to the first aspect is configured so that the sprocket teeth comprise first teeth and second teeth. The first teeth are arranged in the circumferential direction and have a first maximum chain-engaging thickness defined in an axial direction parallel to the rotational center axis of the first annular portion. The second teeth are alternately arranged with the first teeth in the circumferential direction and have a second maximum chain-engaging thickness defined in the axial direction. The second maximum chain-engaging thickness is greater than the first maximum chain-engaging thickness.

In accordance with a fifteenth aspect of the present invention, the bicycle sprocket according to the first aspect is configured so that the attachment member comprises a crank attachment portion to which a crank arm is to be attached.

In accordance with a sixteenth aspect of the present invention, the bicycle sprocket according to the first aspect is configured so that the attachment member comprises a hub engaging portion with which a bicycle hub assembly engages.

In accordance with a seventeenth aspect of the present invention, the bicycle sprocket according to the first aspect is configured so that the first engaging portion includes the protrusion configured to protrude radially inwardly from the first annular portion. The second engaging portion includes the groove provided on the outer peripheral part of the second annular portion.

In accordance with an eighteenth aspect of the present invention, the bicycle sprocket according to the seventeenth aspect is configured so that the second engaging portion includes a first wall part, a second wall part and a closed end part. The first wall part is configured to protrude radially outwardly from the outer peripheral part of the second annular portion. The second wall part is configured to protrude radially outwardly from the outer peripheral part of the second annular portion and is configured to be spaced apart from the first wall part in an axial direction parallel to the rotational center axis of the first annular portion. The closed end part is provided at a circumferential end of the groove and is disposed between the first wall part and the second wall part in the axial direction. The groove is defined by the first wall part, the second wall part and the closed end part. The first wall part and the second wall part are configured to position the protrusion relative to the second engaging portion in the axial direction. The closed end part is configured to position the protrusion relative to the second engaging portion in the circumferential direction.

In accordance with a nineteenth aspect of the present invention, the bicycle sprocket according to the eighteenth aspect is configured so that the second engaging portion includes a recess arranged with the groove. The recess has a circumferential length greater than a circumferential length of the protrusion. The recess is in communication with the groove to introduce the protrusion to the groove.

In accordance with a twentieth aspect of the present invention, the bicycle sprocket according to the first aspect is configured so that the protrusion is configured to extend in the groove in the circumferential direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
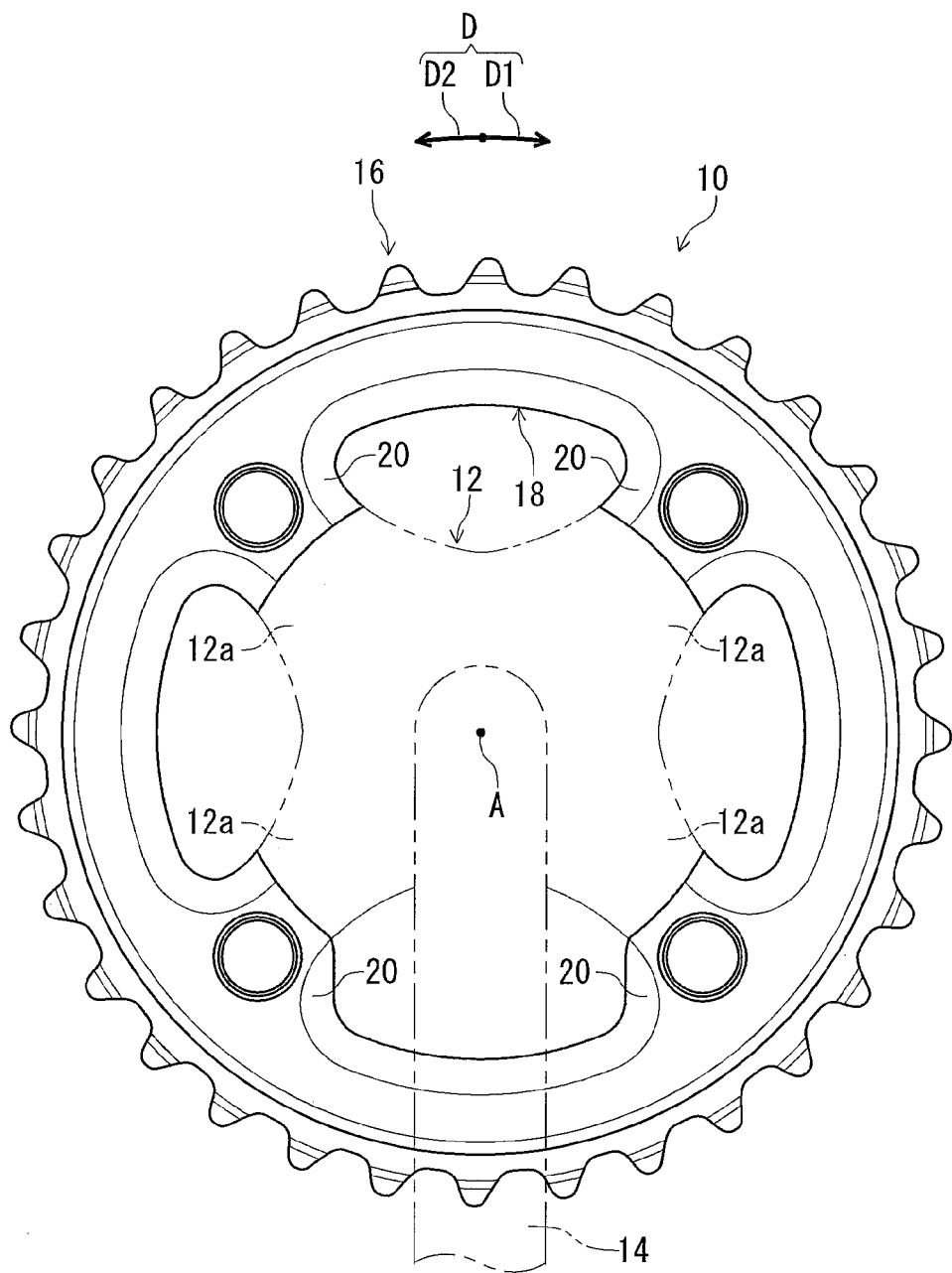
FIG. 1 is an outside elevational view of a bicycle sprocket in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle sprocket 10 in accordance with the first embodiment is illustrated. The bicycle sprocket 10 is a front sprocket configured to be provided on a gear crank (right crank) of a bicycle. The bicycle sprocket 10 is configured to be rotatable about a rotational center axis A. The bicycle sprocket 10 is configured to be fastened to crank connecting arms 12a of a sprocket mounting member 12 by bolts (not shown). The sprocket mounting member 12 is fastened on a crank arm 14 to be rotatable integrally with the crank arm 14 about the rotational center axis A. Namely, the bicycle sprocket 10 is configured to be rotatable integrally with the sprocket mounting member 12 and the crank arm 14 about the rotational center axis A. The bicycle sprocket 10 is configured to be rotated about the rotational center axis A in a rotational driving direction D1 during the pedaling. The rotational driving direction D1 is defined along a circumferential direction D of the bicycle sprocket 10. A direction D2 is defined along the circumferential direction D. The direction D2 is opposite to the rotational driving direction D1.

As seen in FIG. 1, the bicycle sprocket 10 comprises a sprocket member 16 and an attachment member 18. In the illustrated embodiment, the attachment member 18 comprises crank attachment portions 20 to which the crank arm 14 is to be attached. More specifically, the crank arm 14 is attached to the crank attachment portions 20 via the sprocket mounting member 12.

Figure 2:
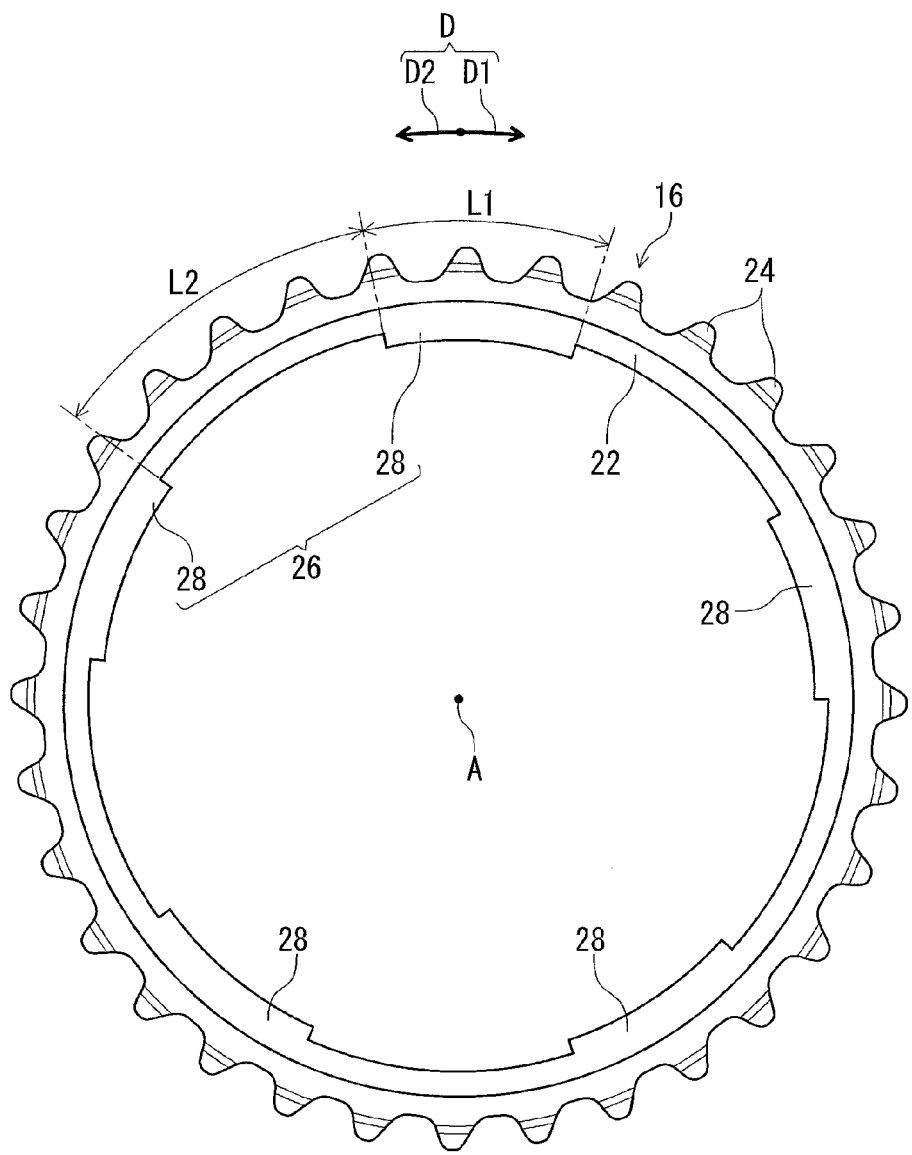
FIG. 2 is an outside elevational view of a sprocket member of the bicycle sprocket illustrated in FIG. 1.

As seen in FIG. 2, the sprocket member 16 comprises a first annular portion 22, sprocket teeth 24 and a first engaging portion 26. The first annular portion 22 has the rotational center axis A. The sprocket teeth 24 are configured to engage with the bicycle chain. The sprocket teeth 24 protrude radially outwardly from the first annular portion 22. The sprocket teeth 24 are arranged in the circumferential direction D of the first annular portion 22. The first engaging portion 26 is provided on an inner peripheral part of the first annular portion 22. In the illustrated embodiment, the first engaging portion 26 includes protrusions 28 configured to protrude radially inwardly from the first annular portion 22. Each of the protrusions 28 extends in the circumferential direction D. The first engaging portion 26 includes the plurality of protrusions 28; however, the first engaging portion 26 can include at least one of the protrusions 28. The protrusions 28 are spaced apart from each other in the circumferential direction D. In the illustrated embodiment, the protrusions 28 have the same shape as each other; however, at least one of the protrusions 28 can have a different shape from another of the protrusions 28.

Each of the protrusions 28 has a circumferential length L1 defined in the circumferential direction D. In the illustrated embodiment, the circumferential length L1 is shorter than a circumferential distance L2 between adjacent two of the protrusions 28 in the circumferential direction D.

Figure 3:
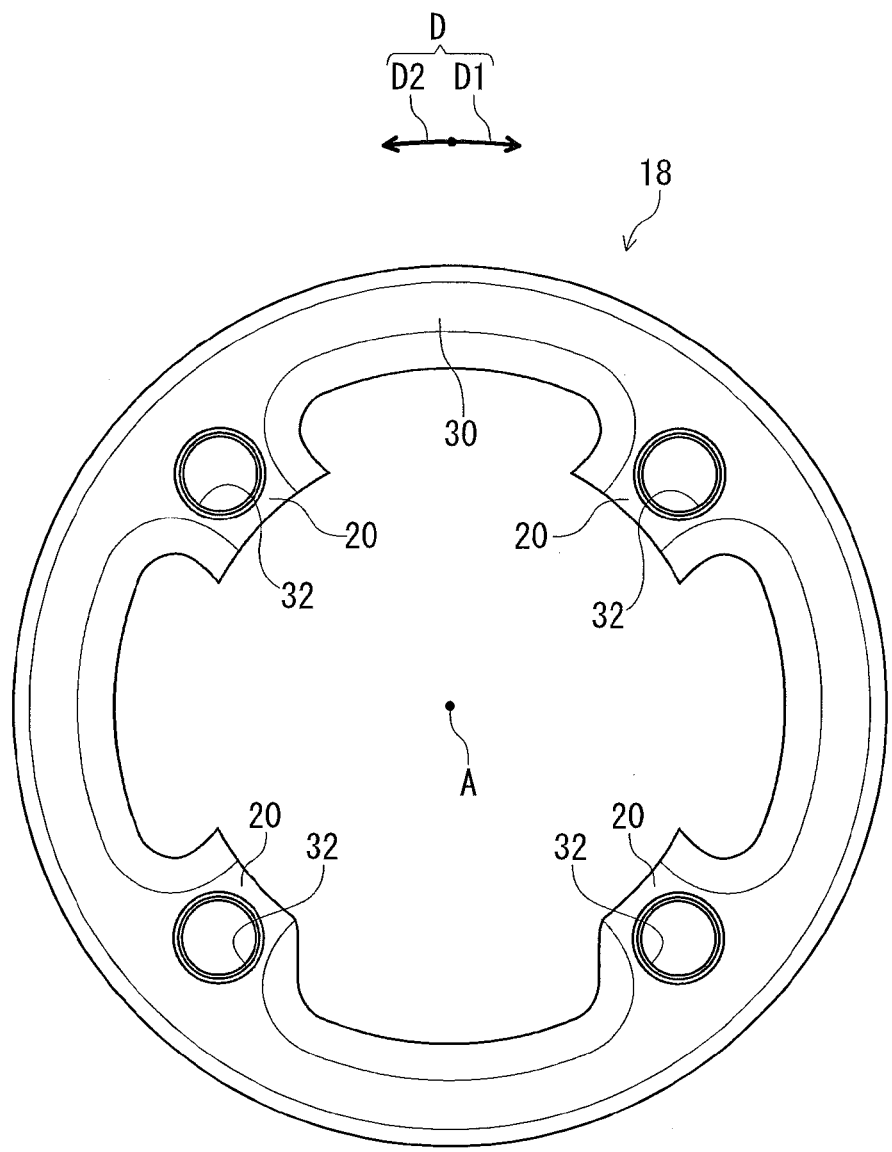
FIG. 3 is an outside elevational view of an attachment member of the bicycle sprocket illustrated in FIG. 1.

As seen in FIG. 3, the attachment member 18 comprises a second annular portion 30. The crank attachment portions 20 are provided on an inner peripheral part of the second annular portion 30. The attachment member 18 includes fastener holes 32 provided at the crank attachment portions 20.

Figure 4:
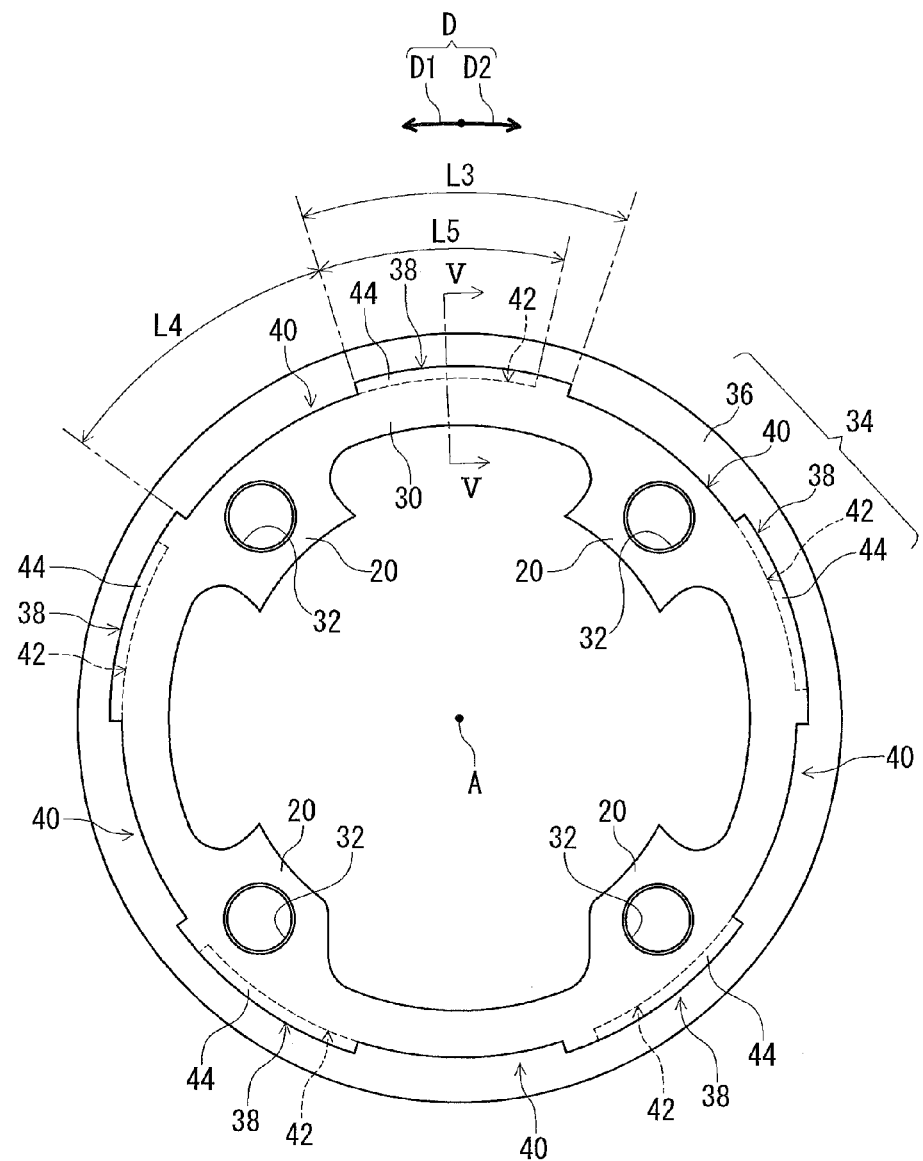
FIG. 4 is an inside elevational view of the attachment member of the bicycle sprocket illustrated in FIG. 1.

As seen in FIG. 4, the attachment member 18 comprises a second engaging portion 34. The second engaging portion 34 is provided on an outer peripheral part of the second annular portion 30. The second engaging portion 34 is configured to engage with the first engaging portion 26 (FIG. 2) of the sprocket member 16. In the illustrated embodiment, the second engaging portion 34 includes a first wall part 36, engaging parts 38 and recesses 40. The first wall part 36 is configured to protrude radially outwardly from the outer peripheral part of the second annular portion 30. In the illustrated embodiment, the first wall part 36 has an annular shape and is provided around the second annular portion 30. The engaging parts 38 are arranged in the circumferential direction D. Each of the recesses 40 is provided between adjacent two of the engaging part 38 in the circumferential direction D. The second engaging portion 34 includes grooves 42 provided on the outer peripheral part of the second annular portion 30. Each of the grooves 42 extends in the circumferential direction D. The grooves 42 are provided in the engaging parts 38, respectively. The recesses 40 are arranged with the grooves 42 in the circumferential direction D, respectively.

Each of the engaging parts 38 has a circumferential length L3 defined in the circumferential direction D. Each of the recesses 40 has a circumferential length L4 defined in the circumferential direction D. In the illustrated embodiment, the circumferential length L3 is substantially equal to the circumferential length L4. Each of the grooves 42 has a circumferential length L5 defined in the circumferential direction D. The circumferential length L5 is shorter than the circumferential length L3. Namely, the circumferential length L4 is greater than the circumferential length L5.

As seen in FIG. 4, the second engaging portion 34 includes second wall parts 44 arranged in the circumferential direction D. Each of the second wall parts 44 constitutes a part of each of the engaging parts 38. Each of the second wall parts 44 extends in the circumferential direction D.

Figure 5:
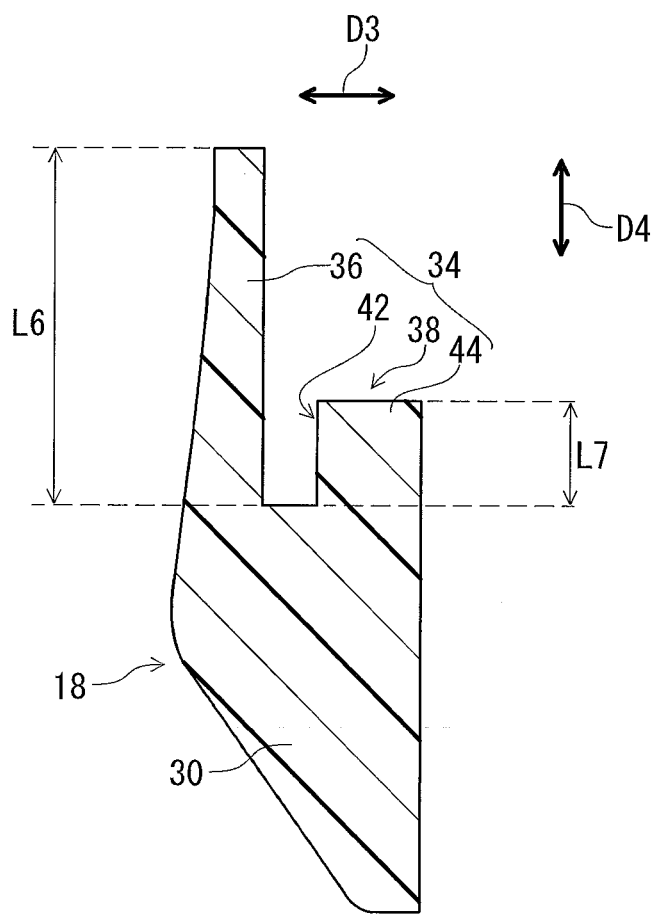
FIG. 5 is a cross-sectional view of the attachment member taken along line V-V of FIG. 4.

As seen in FIG. 5, each of the second wall parts 44 is configured to protrude radially outwardly from the outer peripheral part of the second annular portion 30. Each of the second wall parts 44 is configured to be spaced apart from the first wall part 36 in an axial direction D3 parallel to the rotational center axis A (FIG. 4) of the first annular portion 22. In the illustrated embodiment, the first wall part 36 has a radial length L6 defined in a radial direction D4 of the attachment member 18 (or of the bicycle sprocket 10). Each of the second wall parts 44 has a radial length L7 defined in the radial direction D4. The radial length L6 is greater than the radial length L7.

Figure 6:
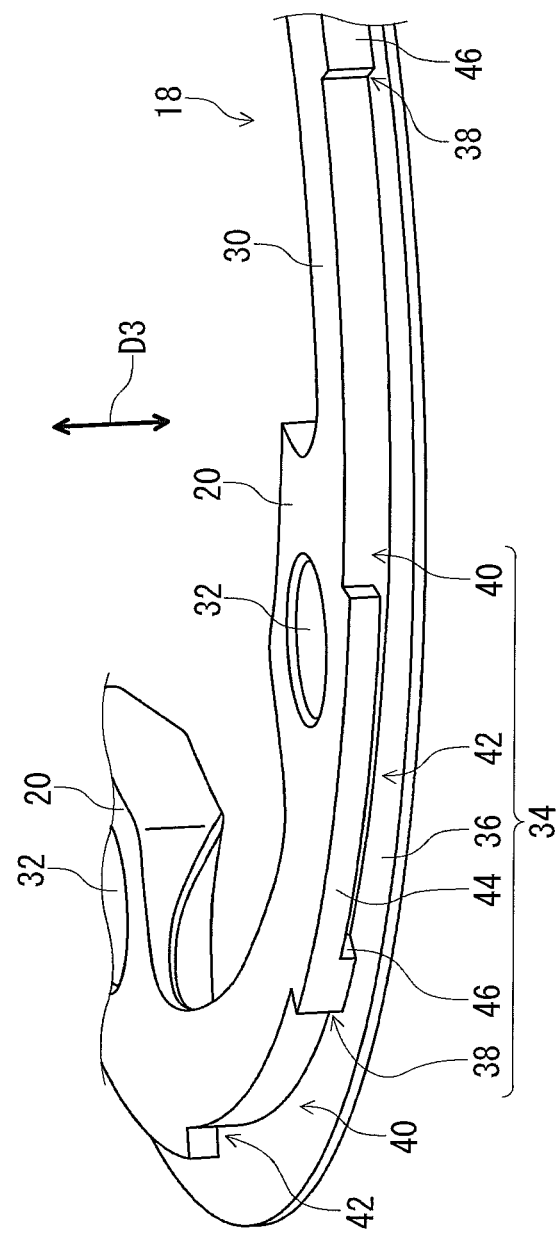
FIG. 6 is a perspective view of the attachment member of the bicycle sprocket illustrated in FIG. 1.

As seen in FIG. 6, the second engaging portion 34 includes closed end parts 46. The closed end part 46 is provided at a circumferential end of the groove 42. The closed end part 46 is disposed between the first wall part 36 and the second wall part 44 in the axial direction D3. The groove 42 is defined by the first wall part 36, the second wall part 44 and the closed end part 46. The second wall part 44 and the closed end part 46 constitute the engaging part 38. The recess 40 is in communication with the groove 42 to introduce the protrusion 28 to the groove 42.

Figure 7:
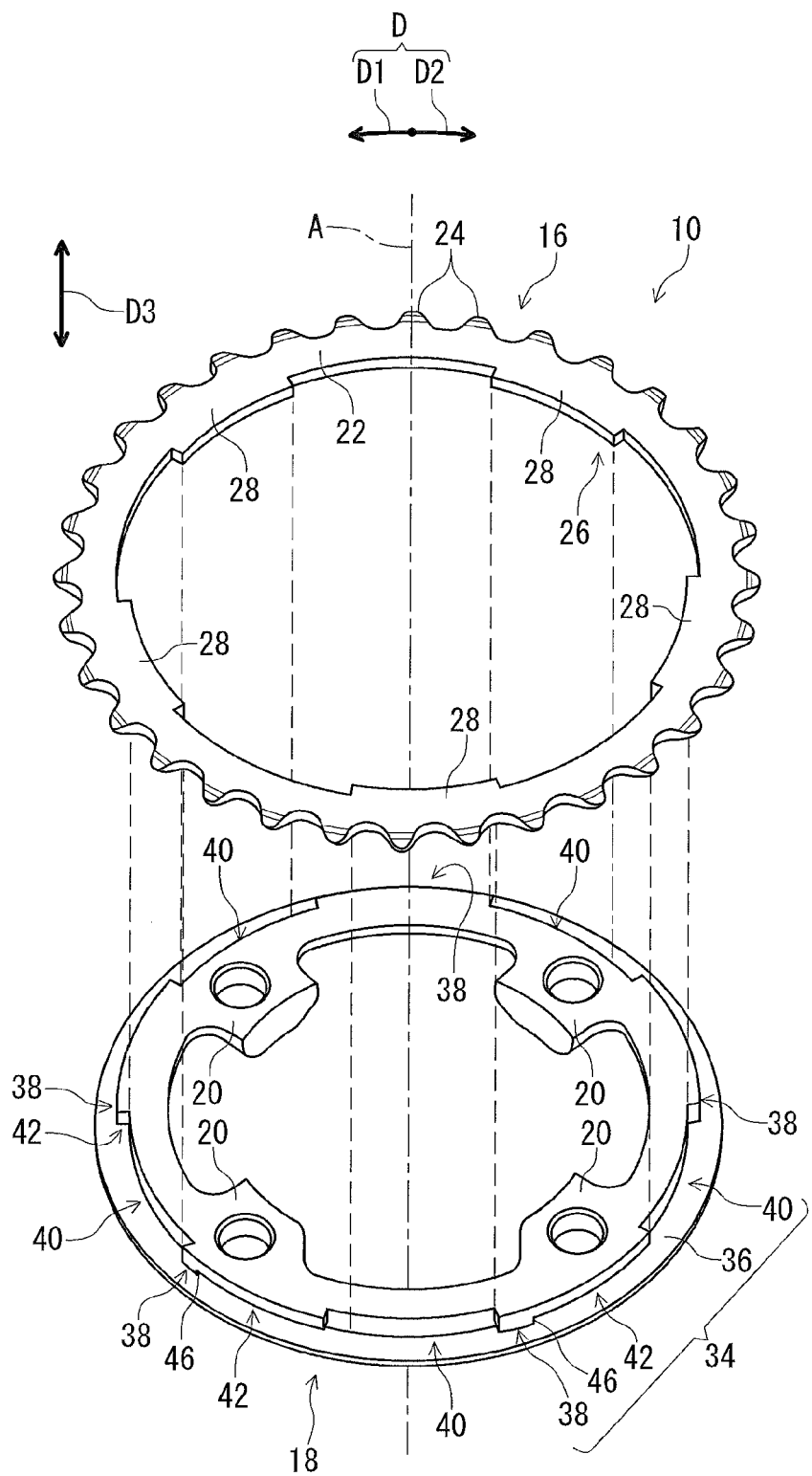
FIG. 7 is an exploded perspective view of the bicycle sprocket illustrated in FIG. 1.

As seen in FIG. 7, the protrusions 28 of the sprocket member 16 are respectively inserted into the recesses 40 of the attachment member 18 in the axial direction D3 when the bicycle sprocket 10 is assembled. In a state where the sprocket member 16 is in contact with the first wall part 36 of the attachment member 18, the sprocket member 16 is then rotated relative to the attachment member 18 in the direction D2 opposite to the rotational driving direction D1. As a result, the protrusions 28 are inserted into the grooves 42, respectively.

Figure 8:
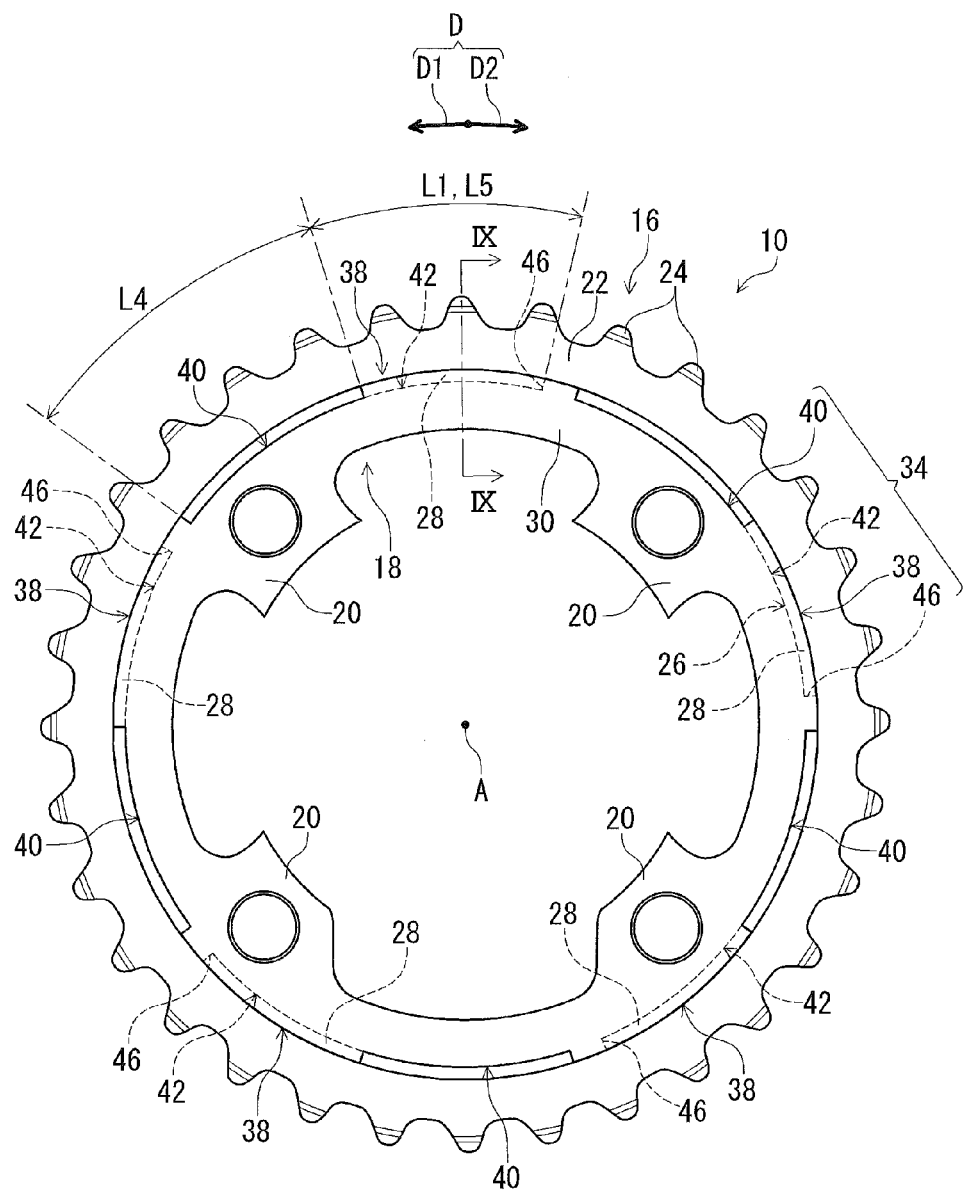
FIG. 8 is an inside elevational view of the bicycle sprocket illustrated in FIG. 1.

As seen in FIG. 8, the protrusion 28 is configured to be fitted in the groove 42. The protrusion 28 is configured to extend in the groove 42 in the circumferential direction D. The second annular portion 30 is provided radially inwardly of the first annular portion 22 in a state where the protrusions 28 are respectively fitted in the grooves 42. The second engaging portion 34 includes the grooves 42 in the illustrated embodiment; however, the second engaging portion 34 can include at least one of the grooves 42. The first engaging portion 26 and the second engaging portion 34 include the protrusions 28 and the grooves 42, respectively; however, the first engaging portion 26 can include the grooves 42 instead of the protrusions 28, and the second engaging portion 34 can include the protrusions 28 instead of the grooves 42. Namely, one of the first engaging portion 26 and the second engaging portion 34 includes the protrusion 28, and the other of the first engaging portion 26 and the second engaging portion 34 includes the groove 42 extending in the circumferential direction D.

The circumferential length L5 of each of the grooves 42 is substantially equal to the circumferential length L1 of each of the protrusions 28. As described above, the circumferential length L4 is greater than the circumferential length L5. Namely, each of the recesses 40 has the circumferential length L4 greater than the circumferential length L1 of each of the protrusions 28.

Figure 9:
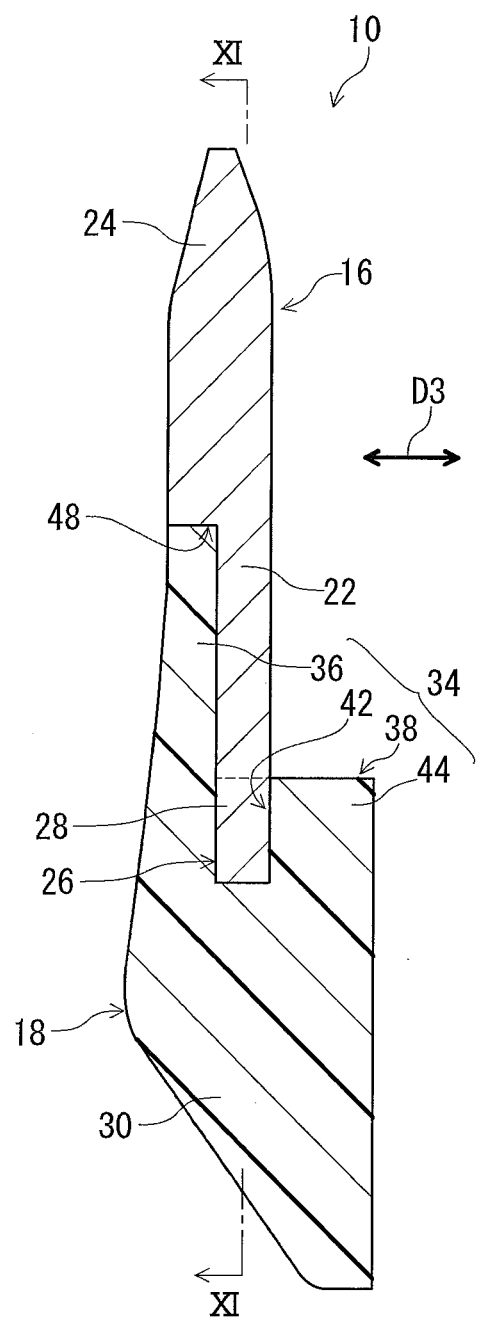
FIG. 9 is a cross-sectional view of the bicycle sprocket taken along line IX-IX of FIG. 8.

As seen in FIG. 9, the attachment member 18 is configured to be bonded to the sprocket member 16. In the illustrated embodiment, the second engaging portion 34 is configured to be bonded to the first engaging portion 26 with adhesive. More specifically, the protrusion 28 is configured to be bonded to the groove 42 with adhesive. The second engaging portion 34 can, however, be bonded to the first engaging portion 26 with other method such as soldering, brazing, welding, or diffusion bonding. Furthermore, a portion other than the protrusion 28 can be bonded to a portion other than the groove 42. The term "bonded" or "bonding", as used herein, encompasses configurations in which an element (e.g., the sprocket member 16) directly bonded to another element (e.g., the attachment member 18) by affixing the element (e.g., the sprocket member 16) is directly to the other element (e.g., the attachment member 18); and configurations in which the element (e.g., the sprocket member 16) is indirectly bonded to the other element (e.g., the attachment member 18) via the intermediate member(s).

The protrusion 28 is fitted between the first wall part 36 and the second wall part 44 in the axial direction D3. The first wall part 36 and the second wall part 44 are configured to position the protrusion 28 relative to the second engaging portion 34 in the axial direction D3. The sprocket member 16 includes an annular engaging recess 48 provided on an axial side of the sprocket member 16. The first wall part 36 is fitted in the annular engaging recess 48.

Figure 10:
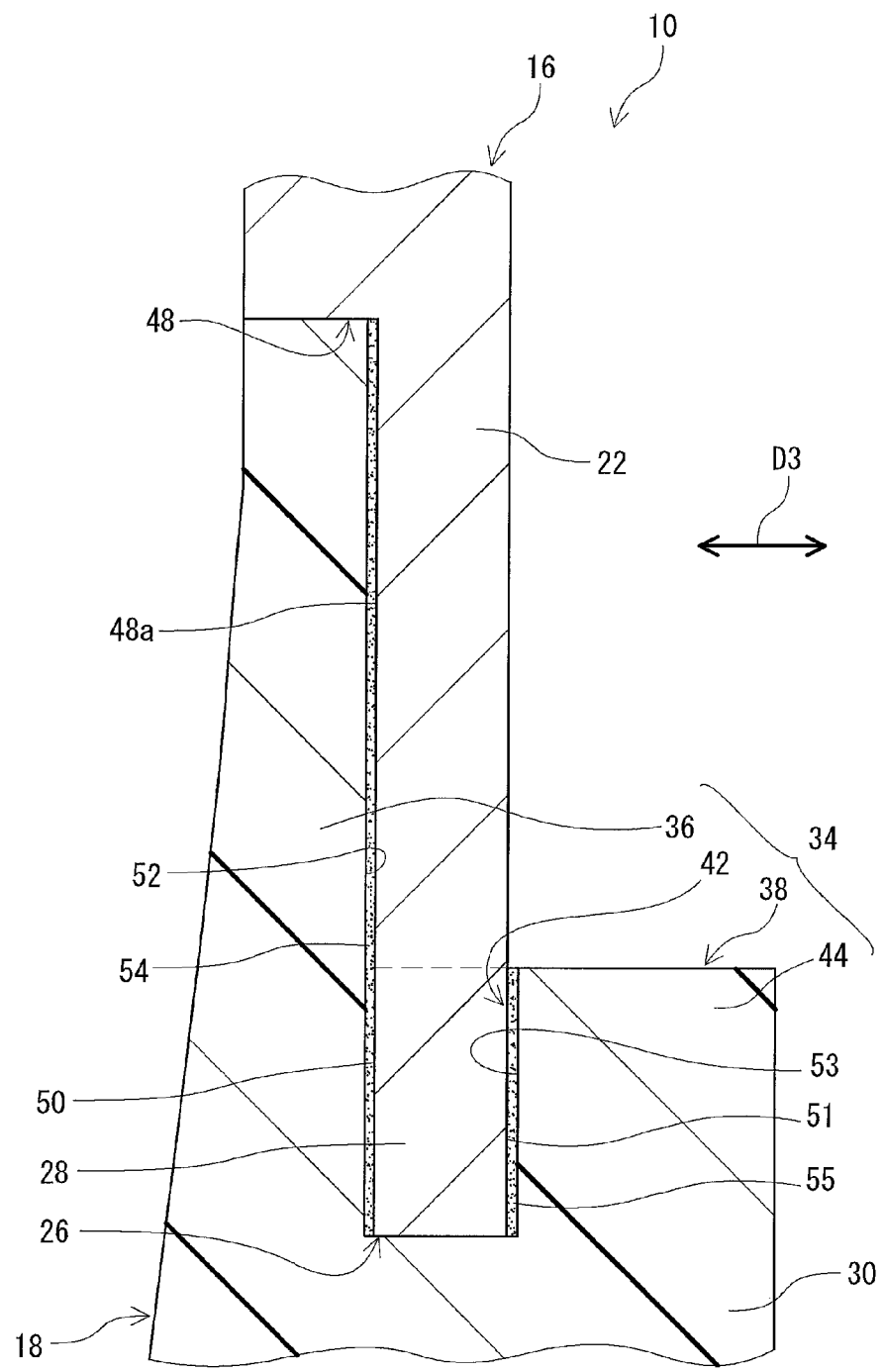
FIG. 10 is an enlarged cross-sectional view showing a part of the bicycle sprocket illustrated in FIG. 9.

As seen in FIG. 10, the first engaging portion 26 includes first engaging surfaces 50 and 51. The second engaging portion 34 includes second engaging surfaces 52 and 53. The second engaging surface 52 is bonded to the first engaging surface 50 with adhesive. The second engaging surface 53 is bonded to the first engaging surface 51 with adhesive. Adhesive layers 54 and 55 are provided between the first engaging surface 50 and the second engaging surface 52 and between the first engaging surface 51 and the second engaging surface 53. Furthermore, the first wall part 36 is bonded to an annular surface 48a of the annular engaging recess 48. The first engaging portion 26 includes the first engaging surfaces 50 and 51 in the illustrated embodiment; however, the first engaging portion 26 can include one of the first engaging surfaces 50 and 51. The second engaging portion 34 includes the second engaging surfaces 52 and 53 in the illustrated embodiment; however, the second engaging portion 34 can include one of the second engaging surfaces 52 and 53. Each of areas of the first engaging surfaces 50 and 51 is not limited to the illustrated embodiment in FIG. 10. Each of areas of the second engaging surfaces 52 and 53 is not limited to the illustrated embodiment in FIG. 10.

Materials used in the bicycle sprocket 10 will be described below. The sprocket member 16 comprises a first material. In the illustrated embodiment, the first material comprises a first metallic material. For example, the first material can comprise iron or titanium; however, the first material can comprise material other than iron and titanium. Furthermore, the first material can comprise a non-metallic material.

The attachment member 18 comprises a second material different from the first material. The second material comprises a non-metallic material. For example, the second material comprises a fiber reinforced plastic; however, the second material can comprise material other than the fiber reinforced plastic. For example, the second material comprises a second metallic material different from the first metallic material. The second material can comprise aluminum. In the illustrated embodiment, the first material has a first density. The second material has a second density lower than the first density.

In case that the first material comprises a metallic material and the second material comprises a non-metallic material, the sprocket member 16 is bonded to the attachment member 18 with adhesive, for example. In case that the first material comprises a metallic material and the second material comprises a metallic material, the sprocket member 16 is bonded to the attachment member 18 with soldering, brazing, welding, or diffusion bonding, for example.

Figure 11:
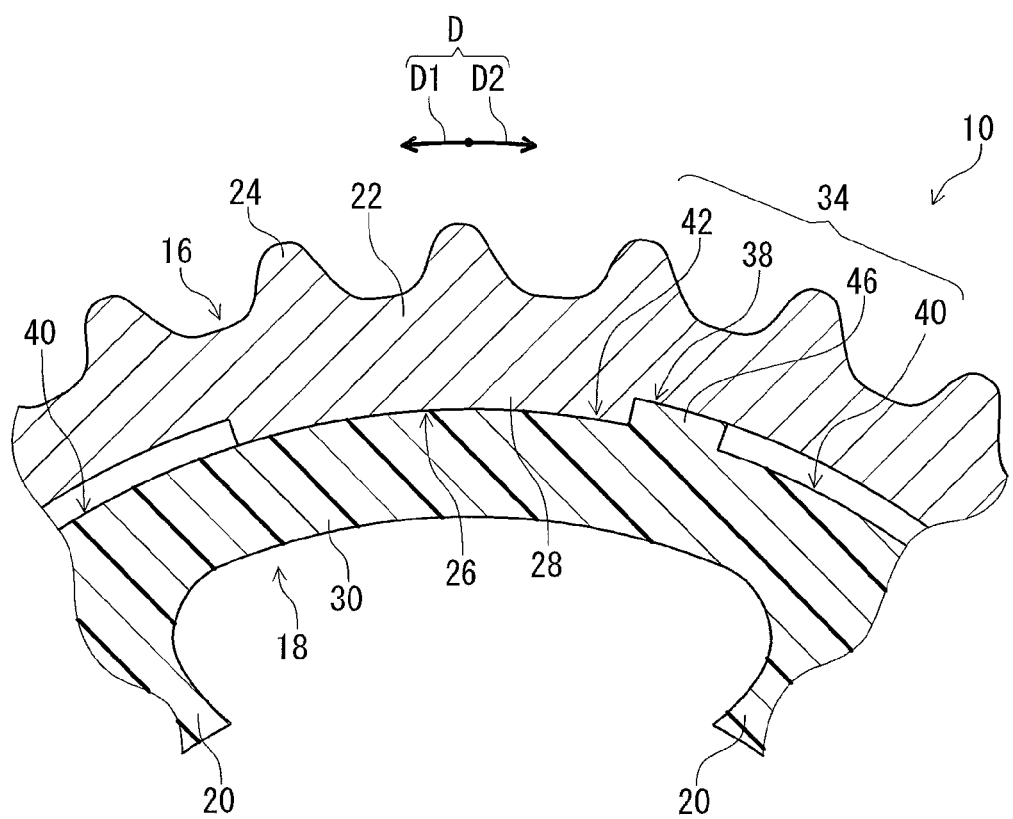
FIG. 11 is a cross-sectional view of the bicycle sprocket taken along line XI-XI of FIG. 9.

As seen in FIG. 11, the closed end part 46 is configured to position the protrusion 28 relative to the second engaging portion 34 in the circumferential direction D. In the illustrated embodiment, the closed end part 46 is configured to position the protrusion 28 relative to the second engaging portion 34 in the direction D2 opposite to the rotational driving direction D1. The protrusion 28 is provided on a forward side of the closed end part 46 in the rotational driving direction D1. The rotational driving force is transmitted from the attachment member 18 to the sprocket member 16 in the rotational driving direction D1 via the closed end part 46 and the protrusion 28 during pedaling.

With the bicycle sprocket 10 in accordance with the first embodiment, the second engaging portion 34 includes grooves 42, and the first engaging portion 26 includes the protrusions 28 configured to be fitted in the grooves 42. Accordingly, the sprocket member 16 can be bonded to the attachment member 18 while the sprocket member 16 and the attachment member 18 can be made of different materials from each other. Thus, flexibility in the design of the bicycle sprocket 10 can be improved.

Second Embodiment

A bicycle sprocket 110 in accordance with the second embodiment will be described below referring to FIG. 12. The bicycle sprocket 110 has the same configuration as the bicycle sprocket 10 except for the structure of the sprocket member. Thus, elements having substantially the same function as those in the first embodiment will be numbered the same here, and will not be described again in detail here for the sake of brevity.

Figure 12:
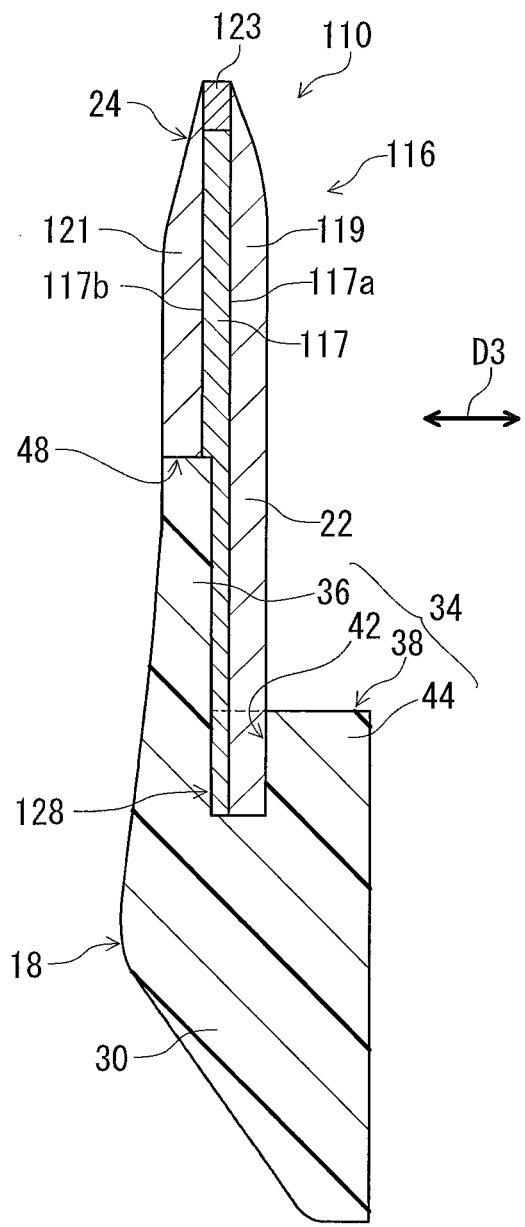
FIG. 12 is a cross-sectional view of a bicycle sprocket in accordance with a second embodiment.

As seen in FIG. 12, the bicycle sprocket 110 comprises a sprocket member 116. The sprocket member has a multi-layered structure with different materials. More specifically, the sprocket member includes a first layered member 117, a second layered member 119, a third layered member 121, and preferably a coating layer 123. The first layered member 117 includes a first surface 117a and a second surface 117b opposite to the first surface 117a in the axial direction D3 of the bicycle sprocket 110. The second layered member 119 is attached to the first surface 117a of the first layered member 117. The third layered member 121 is attached to the second surface 117b of the first layered member 117. The coating layer 123 is provided on a radially end surface of the first layered member 117 between the second layered member 119 and the third layered member 121. The first layered member 117 is made of a metallic material such as aluminum, titanium, magnesium or beryllium. The second layered member 119 is made of a metallic material such as iron or stainless steel. The third layered member 121 is made of a metallic material such as iron or stainless steel. The coating layer 123 is made of a metallic material such as iron or stainless steel. In the illustrated embodiment, the second layered member 119 and the third layered member 121 are bonded to the first layered member 117 by diffusion bonding, for example. The first layered member 117 can be made of a non-metallic material such as a resin material. In the illustrated embodiment, the first layered member 117 and the second layered member 119 provide protrusions 128 as the protrusions 28 of the first embodiment.

With the bicycle sprocket 110 in accordance with the second embodiment, it is possible to save weight of the sprocket member 116 in addition to the improving of flexibility in the design of the bicycle sprocket 110.

Third Embodiment

A bicycle sprocket 210 in accordance with the third embodiment will be described below referring to FIGS. 13 to 15. The bicycle sprocket 210 has the same configuration as the bicycle sprocket 10 except for the structure of the sprocket member. Thus, elements having substantially the same function as those in the above embodiments will be numbered the same here, and will not be described again in detail here for the sake of brevity.

Figure 13:
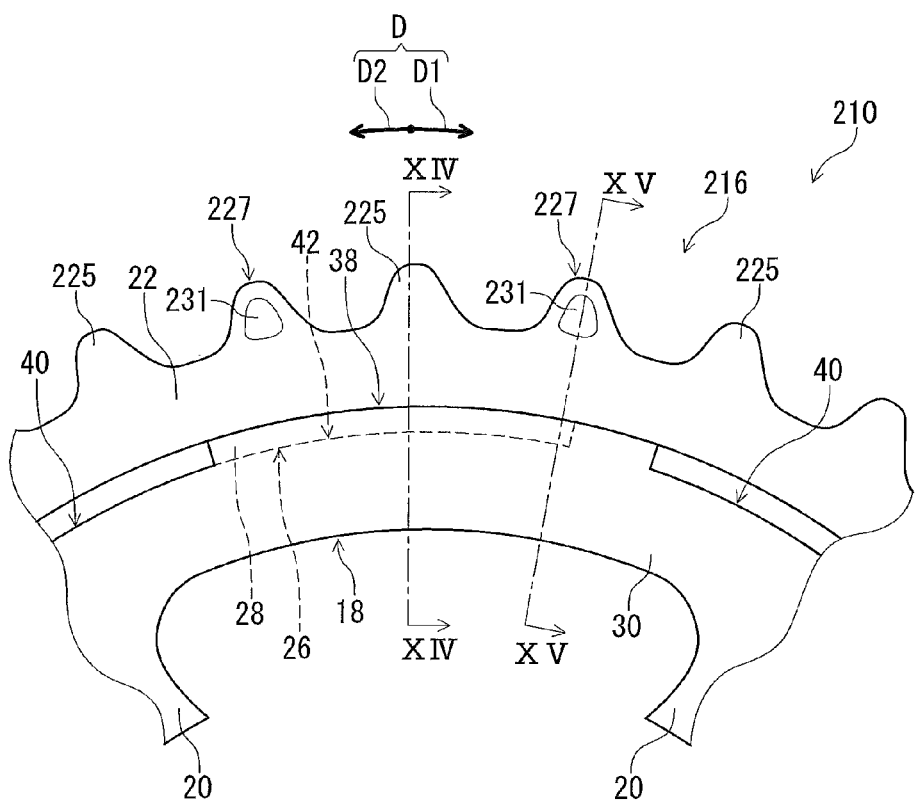
FIG. 13 is an inside elevational view of a part of a bicycle sprocket in accordance with a third embodiment.

As seen in FIG. 13, the bicycle sprocket 210 comprises a sprocket member 216 including sprocket teeth protruding radially outwardly from the first annular portion 22. The sprocket teeth comprise first teeth 225 and second teeth 227. The first teeth 225 are arranged in the circumferential direction D. The second teeth 227 are alternately arranged with the first teeth 225 in the circumferential direction D.

Figure 14:
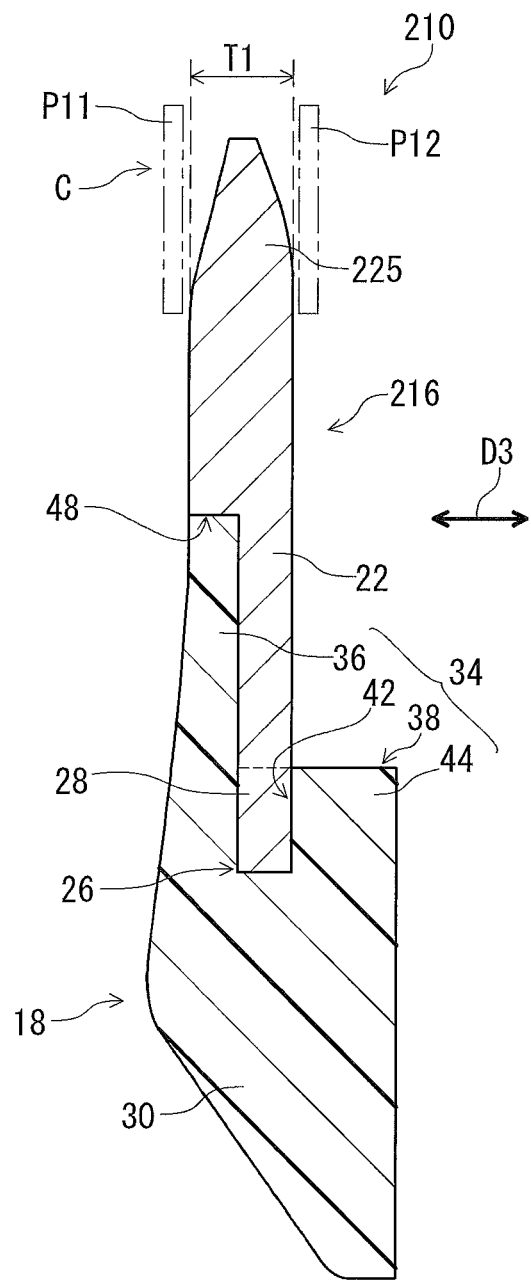
FIG. 14 is a cross-sectional view of the bicycle sprocket taken along line XIV-XIV of FIG. 13.

As seen in FIG. 14, the first teeth 225 have substantially the same structure as the sprocket teeth 24 of the sprocket member 16 in accordance with the first embodiment, for example. Each of the first teeth 225 is configured to engage between inner link plates P11 and P12 of a bicycle chain C. The first teeth 225 have a first maximum chain-engaging thickness T1 defined in the axial direction D3 parallel to the rotational center axis A of the first annular portion 22. The first maximum chain-engaging thickness T1 is a maximum thickness of a part configured to engage with the inner link plates P11 and P12 of the bicycle chain C in each of the first teeth 225.

Figure 15:
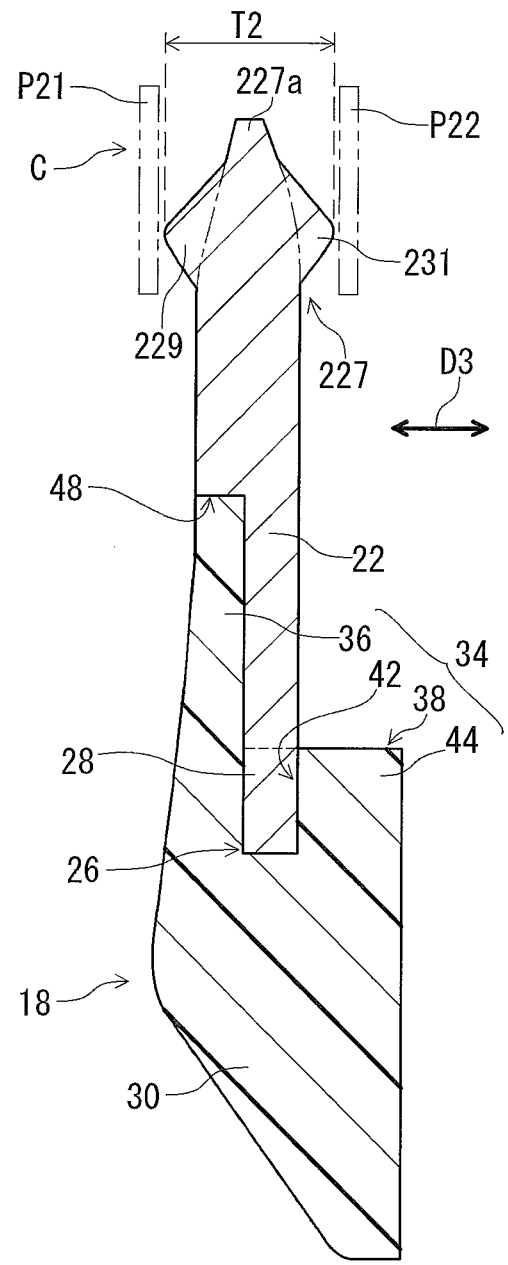
FIG. 15 is a cross-sectional view of the bicycle sprocket taken along line XV-XV of FIG. 13.

As seen in FIG. 15, each of the second teeth 227 includes a base tooth portion 227a, a first projection 229 and a second projection 231. In the illustrated embodiment, the base tooth portion 227a has substantially the same shape as the first teeth 225. The first projection 229 protrudes from the base tooth portion 227a in the axial direction D3. The second projection 231 protrudes from the base tooth portion 227a in the axial direction D3. The second projection 231 is provided on an opposite side of the first projection 229 with respect to the base tooth portion 227a. Each of the second teeth 227 is configured to engage between outer link plates P21 and P22 of the bicycle chain C. The second teeth 227 have a second maximum chain-engaging thickness T2 defined in the axial direction D3. The second maximum chain-engaging thickness T2 is a maximum thickness of a part configured to engage with the bicycle chain C in each of the second teeth 227. In the illustrated embodiment, the second maximum chain-engaging thickness T2 is greater than the first maximum chain-engaging thickness T1. The second maximum chain-engaging thickness T2 is a maximum thickness of a part configured to engage with the outer link plates P21 and P22 of the bicycle chain C in each of the second teeth 227.

With the bicycle sprocket 210 in accordance with the third embodiment, the second teeth 227 can reduce undesirable disengagement of the bicycle chain C from the bicycle sprocket 210 in addition to the improving of flexibility in the design of the bicycle sprocket 210.

Fourth Embodiment

A bicycle sprocket 310 in accordance with the fourth embodiment will be described below referring to FIG. 16. The bicycle sprocket 310 has the same configuration as the bicycle sprocket 10 except for the structure of the attachment member. Thus, elements having substantially the same function as those in the above embodiments will be numbered the same here, and will not be described again in detail here for the sake of brevity.

Figure 16:
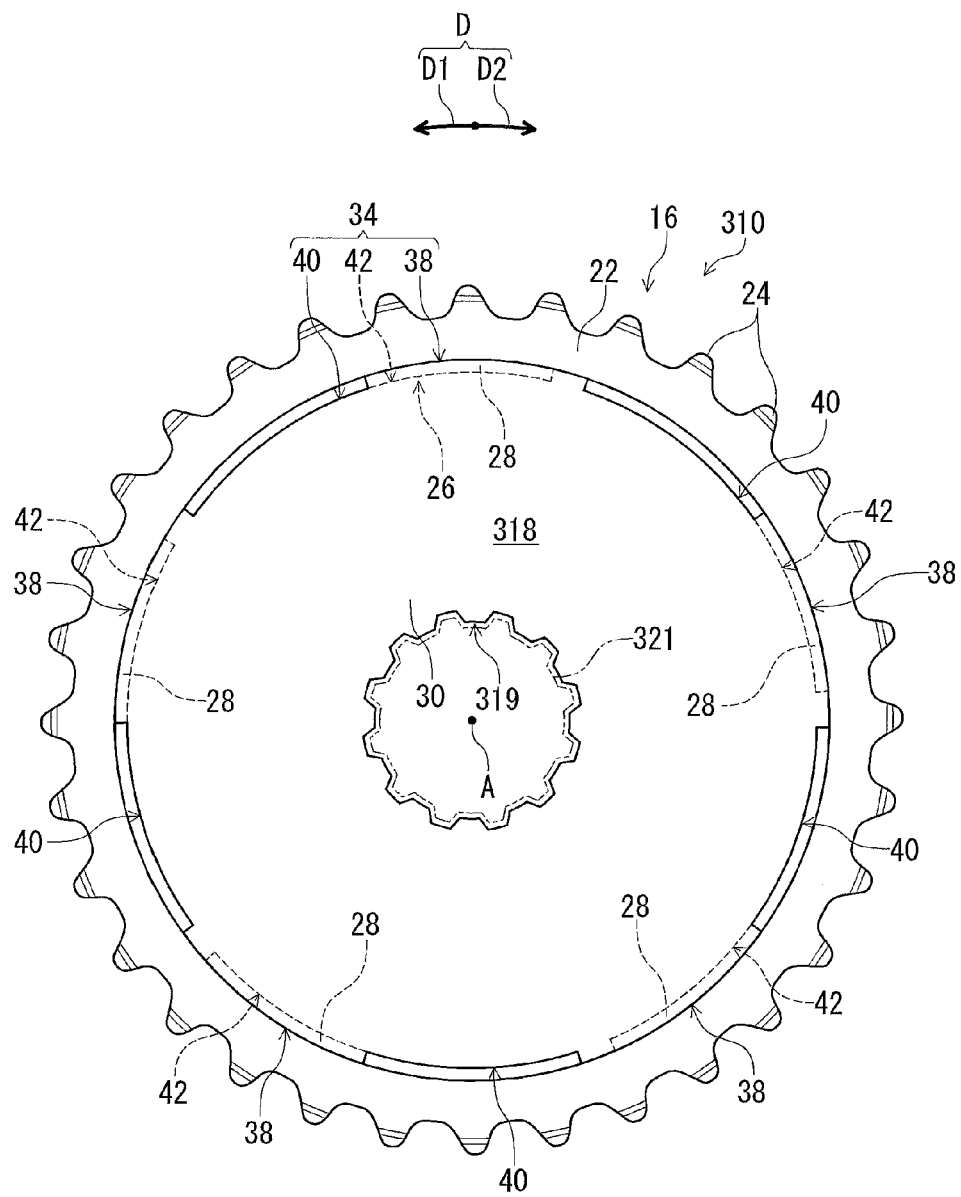
FIG. 16 is an inside elevational view of a bicycle sprocket in accordance with a fourth embodiment.

As seen in FIG. 16, the bicycle sprocket 310 in accordance with the fourth embodiment comprises a bicycle rear sprocket. The bicycle sprocket 310 includes an attachment member 318. Instead of the crank attachment portions 20 in accordance with the first embodiment, the attachment member 318 comprises a hub engaging portion 319 with which a bicycle hub assembly 321 engages. The hub engaging portion 319 is provided on the inner peripheral part of the second annular portion 30. In the illustrated embodiment, the hub engaging portion 319 has a spline structure; however, the hub engaging portion can have other structures.

With the bicycle sprocket 310 in accordance with the fourth embodiment, flexibility in the design of the bicycle rear sprocket 310 can be improved as well as the bicycle sprocket 10 in accordance with the first embodiment.

Fifth Embodiment

A bicycle sprocket 410 in accordance with the fourth embodiment will be described below referring to FIG. 17. The bicycle sprocket 410 has the same configuration as the bicycle sprocket 10 except for the structure of the first and second engaging portions. Thus, elements having substantially the same function as those in the above embodiments will be numbered the same here, and will not be described again in detail here for the sake of brevity.

Figure 17:
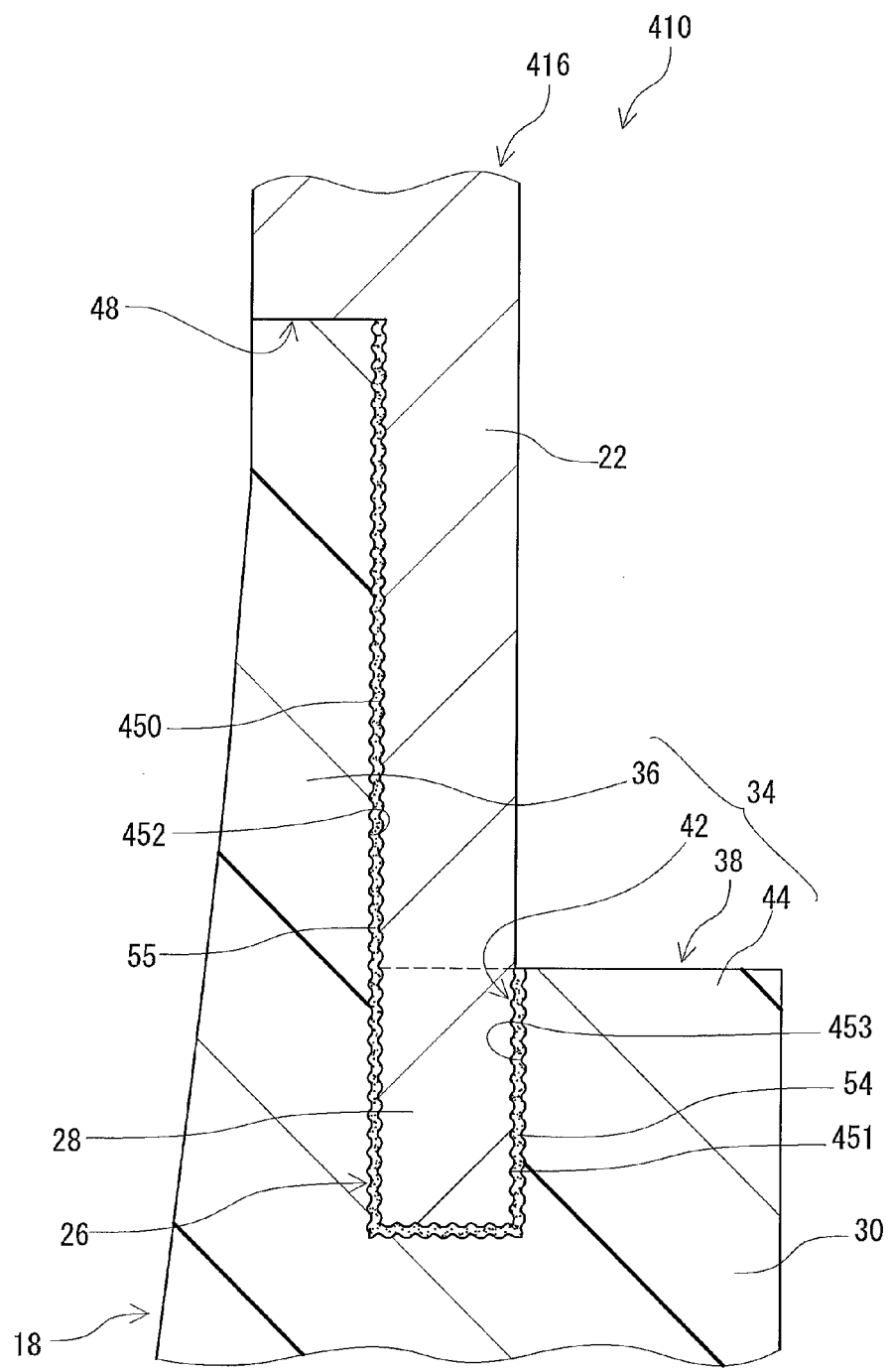
FIG. 17 is an enlarged cross-sectional view showing a part of a bicycle sprocket in accordance with a fifth embodiment.

As seen in FIG. 17, the first engaging portion 26 includes the first engaging surfaces 450 and 451. The second engaging portion 34 includes the second engaging surfaces 452 and 453. At least one of the first engaging surface 450 and the second engaging surface 452 is rougher than at least part of a surface other than the first engaging surface 450 and the second engaging surface 452 in the bicycle sprocket 410. Furthermore, at least one of the first engaging surface 451 and the second engaging surface 453 is rougher than at least part of a surface other than the first engaging surface 451 and the second engaging surface 453 in the bicycle sprocket 410. In the illustrated embodiment, each of the first engaging surface 450 and the second engaging surface 452 is rougher than a surface other than the first engaging surface 450 and the second engaging surface 452. Each of the first engaging surface 451 and the second engaging surface 453 is rougher than a surface other than the first engaging surface 451 and the second engaging surface 453. Each of the first engaging surface 450 and 451 and the second engaging surfaces 452 and 453 is applied with roughening process. Possible examples of the roughening process include machine processes such as shot blasting, chemical processes such as etching, and other processes such as laser machining. Areas of the first and second engaging surfaces 450, 451, 452 and 453 are not limited to the illustrated embodiment in FIG. 17.

With the bicycle sprocket 410 in accordance with the fifth embodiment, the roughened first and second engaging surfaces 450, 451, 452 and 453 can increase bonding strength between the sprocket member 16 and the attachment member 18 in addition to the improving of flexibility in the design of the bicycle sprocket 410.

In the above embodiments, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "fixed" and their derivatives except for the terms "bonded" and "bonding."

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket comprising:
   a sprocket member comprising:
      a first annular portion having a rotational center axis;
      sprocket teeth protruding radially outwardly from the first annular portion and arranged in a circumferential direction of the first annular portion; and
      a first engaging portion provided on an inner peripheral part of the first annular portion; and
   an attachment member configured to be bonded to the sprocket member and comprising:
      a second annular portion provided radially inwardly of the first annular portion; and
      a second engaging portion provided on an outer peripheral part of the second annular portion and configured to engage with the first engaging portion, one of the first engaging portion and the second engaging portion including a protrusion, the other of the first engaging portion and the second engaging portion including
         a groove extending in the circumferential direction, the protrusion being configured to be fitted in the groove,
         a first wall part configured to protrude radially from one of the inner peripheral part of the first annular portion and the outer peripheral part of the second annular portion, and
         a second wall part configured to protrude radially from the one of the inner peripheral part of the first annular portion and the outer peripheral part of the second annular portion and configured to be spaced apart from the first wall part in an axial direction parallel to the rotational center axis of the first annular portion, the groove being at least partially defined between the first wall part and the second wall part in the axial direction.

2. The bicycle sprocket according to claim 1, wherein the second engaging portion is configured to be bonded to the first engaging portion with adhesive.

3. The bicycle sprocket according to claim 1, wherein the protrusion is configured to be bonded to the groove with adhesive.

4. The bicycle sprocket according to claim 1, wherein the sprocket member comprises a first material, and the attachment member comprises a second material different from the first material.

5. The bicycle sprocket according to claim 4, wherein the first material comprises a first metallic material, and the second material comprises a second metallic material different from the first metallic material.

6. The bicycle sprocket according to claim 4, wherein the first material has a first density, and the second material has a second density lower than the first density.

7. The bicycle sprocket according to claim 4, wherein the first material comprises iron.

8. The bicycle sprocket according to claim 4, wherein the first material comprises titanium.

9. The bicycle sprocket according to claim 4, wherein the second material comprises aluminum.

10. The bicycle sprocket according to claim 4, wherein the second material comprises a non-metallic material.

11. The bicycle sprocket according to claim 4, wherein the second material comprises a fiber reinforced plastic.

12. The bicycle sprocket according to claim 1, wherein the sprocket member has a multi-layered structure with different materials.

13. The bicycle sprocket according to claim 1, wherein the first engaging portion includes a first engaging surface, the second engaging portion includes a second engaging surface bonded to the first engaging surface with adhesive, and
    at least one of the first engaging surface and the second engaging surface is rougher than at least part of a surface other than the first engaging surface and the second engaging surface in the bicycle sprocket.

14. The bicycle sprocket according to claim 1, wherein the sprocket teeth comprise
    first teeth arranged in the circumferential direction and having a first maximum chain-engaging thickness defined in the axial direction parallel to the rotational center axis of the first annular portion, and
    second teeth alternately arranged with the first teeth in the circumferential direction and having a second maximum chain-engaging thickness defined in the axial direction, and
    the second maximum chain-engaging thickness is greater than the first maximum chain-engaging thickness.

15. The bicycle sprocket according to claim 1, wherein the attachment member comprises a crank attachment portion to which a crank arm is to be attached.

16. The bicycle sprocket according to claim 1, wherein the attachment member comprises a hub engaging portion with which a bicycle hub assembly engages.

17. The bicycle sprocket according to claim 1, wherein the first engaging portion includes the protrusion configured to protrude radially inwardly from the first annular portion, and
    the second engaging portion includes the groove provided on the outer peripheral part of the second annular portion.

18. The bicycle sprocket according to claim 17, wherein the second engaging portion includes
    the first wall part configured to protrude radially outwardly from the outer peripheral part of the second annular portion,
    the second wall part configured to protrude radially outwardly from the outer peripheral part of the second annular portion and configured to be spaced apart from the first wall part in the axial direction parallel to the rotational center axis of the first annular portion, and
    a closed end part provided at a circumferential end of the groove and disposed between the first wall part and the second wall part in the axial direction,
    the groove is defined by the first wall part, the second wall part and the closed end part,
    the first wall part and the second wall part are configured to position the protrusion relative to the second engaging portion in the axial direction, and
    the closed end part is configured to position the protrusion relative to the second engaging portion in the circumferential direction.

19. The bicycle sprocket according to claim 18, wherein the second engaging portion includes a recess arranged with the groove,
    the recess has a circumferential length greater than a circumferential length of the protrusion, and
    the recess is in communication with the groove to introduce the protrusion to the groove.

20. The bicycle sprocket according to claim 1, wherein the protrusion is configured to extend in the groove in the circumferential direction.

21. The bicycle sprocket according to claim 1, wherein
the first wall part has a first radial length defined in a radial direction of the bicycle sprocket,
the second wall part has a second radial length defined in the radial direction, and
the first radial length is longer than the second radial length.

22. The bicycle sprocket according to claim 1, wherein
the second engaging portion includes a plurality of second wall parts provided as the second wall part, and
each of the plurality of second wall parts protrudes radially outwardly from the outer peripheral part of the second annular portion and is spaced apart from the first wall part in the axial direction.

23. The bicycle sprocket according to claim 22, wherein
the second engaging portion including a plurality of grooves provided as the groove, and
each of the plurality of grooves extends in the circumferential direction.

24. The bicycle sprocket according to claim 23, wherein
the plurality of grooves are at least partially defined between the first wall part and the plurality of second wall parts in the axial direction, respectively.

25. The bicycle sprocket according to claim 24, wherein
the first engaging portion includes a plurality of protrusions provided as the protrusion, and
the plurality of protrusions are respectively fitted in the plurality of grooves.

26. The bicycle sprocket according to claim 22, wherein
the first wall part has a first radial length defined in a radial direction of the bicycle sprocket,
at least one of the plurality of second wall parts has a second radial length defined in the radial direction, and
the first radial length is longer than the second radial length.

27. The bicycle sprocket according to claim 22, wherein
the plurality of second wall parts are spaced apart from each other in the circumferential direction.

28. The bicycle sprocket according to claim 27, wherein
the second engaging portion includes a plurality of recesses respectively provided between adjacent two of the plurality of second wall part in the circumferential direction.

29. The bicycle sprocket according to claim 28, wherein
the second engaging portion including a plurality of grooves provided as the groove,
each of the plurality of grooves extends in the circumferential direction,
the plurality of grooves are at least partially defined between the first wall part and the plurality of second wall parts in the axial direction, respectively, and
the plurality of recesses are respectively in communication with the plurality of grooves.

\* \* \* \* \*